(12) United States Patent
Evans

(10) Patent No.: US 6,348,110 B1
(45) Date of Patent: *Feb. 19, 2002

(54) METHODS OF MANUFACTURING ROTARY DRILL BITS

(75) Inventor: Stephen Martin Evans, Standish (GB)

(73) Assignee: Camco International (UK) Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,306

(22) Filed: Apr. 5, 2000

Related U.S. Application Data

(62) Division of application No. 09/108,748, filed on Jul. 1, 1998, now Pat. No. 6,116,360.

(30) Foreign Application Priority Data

Oct. 31, 1997 (GB) .............................................. 9722887

(51) Int. Cl.⁷ .................................................. C23C 8/26
(52) U.S. Cl. ...................................... 148/528; 148/228
(58) Field of Search ................................. 148/528, 228, 148/238; 175/371, 435

(56) References Cited

U.S. PATENT DOCUMENTS

| | | | |
|---|---|---|---|
| 4,699,227 A | 10/1987 | Wardley | 175/329 |
| 4,781,256 A | 11/1988 | Wardley | 175/329 |
| 5,666,864 A | * 9/1997 | Tibbits | 76/108.2 |
| 6,148,936 A | * 11/2000 | Evans et al. | 175/425 |

FOREIGN PATENT DOCUMENTS

| | | |
|---|---|---|
| EP | 198 627 | 10/1986 |
| EP | 474 092 | 3/1992 |
| GB | 2 075 396 | 11/1981 |
| GB | 2 211 874 | 7/1989 |

* cited by examiner

*Primary Examiner*—Roy King
*Assistant Examiner*—Harry D. Wilkins, III
(74) *Attorney, Agent, or Firm*—Jeffery E. Daly

(57) ABSTRACT

A rotary drill bit is manufactured by a method including the step of forming at least a portion of the bit body from a precipitation hardening alloy, and brazing cutters to the bit body by a heating and cooling cycle during which the bit body is first heated to a temperature sufficient to melt the brazing material and is then cooled to room temperature, the heating and cooling brazing cycle being controlled in a manner so as also to effect precipitation hardening of the alloy from which the bit body is formed. In the case where the bit body is formed from solid infiltrated matrix material around a solid preformed mandrel, the heating and cooling cycle of the matrix forming process may also be controlled in a manner to effect precipitation hardening of the alloy from which the mandrel is formed.

12 Claims, 2 Drawing Sheets

METHODS OF MANUFACTURING ROTARY DRILL BITS

This is a Divisional of U.S. patent application Ser. No. 09/108,748, now U.S. Pat. No. 6,116,360, filed Jul. 1, 1998, by Stephen Martin Evans, entitled "METHODS OF MANUFACTURING ROTARY DRILL BITS".

BACKGROUND OF THE INVENTION

1. Field of the Invention

The invention relates to methods of manufacturing rotary drill bits, and particularly rotary drag-type drill bits of the kind comprising a bit body having a threaded shank for connection to a drill string and a leading face on which are mounted a plurality of cutters secured to the bit body by brazing.

2. Description of Related Art

The cutters may, for example, be preform cutting elements comprising a layer of superhard material, such as polycrystalline diamond, bonded to a substrate of less hard material, such as cemented tungsten carbide. The substrate of the cutting element may be bonded, for example by brazing, to a carrier which may also be of cemented tungsten carbide, the carrier then being brazed within a socket on the leading face of the bit body. Alternatively, the substrate of the cutter may itself be of sufficient size to be brazed directly within a socket in the bit body.

Drag-type drill bits of this kind are commonly of two basic types. The bit body may be machined from metal, usually steel, and in this case the sockets to receive the cutters are formed in the bit body by conventional machining processes. Alternatively, the bit body may be formed using a powder metallurgy process in which a metal mandrel is located within a graphite mold, the internal shape of which corresponds to the desired external shape of the bit body. The space between the mandrel and the interior of the mold is packed with a particulate matrix-forming material, such as tungsten carbide particles, and this material is then infiltrated with a binder alloy, usually a copper alloy, in a furnace which is raised to a sufficiently high temperature to melt the body of the infiltration alloy and cause it to infiltrate downwardly through the matrix-forming particles under gravity. The mandrel and matrix material are then cooled to room temperature so that the infiltrate solidifies so as to form, with the particles, a solid infiltrated matrix surrounding and bonded to the metal mandrel.

Sockets to receive the cutters are formed in the matrix by mounting graphite formers in the mold before it is packed with the particulate material so as to define sockets in the material, the formers being removed from the sockets after formation of the matrix. Alternatively or additionally, the sockets may be machined in the matrix. The cutters are again secured in the sockets by brazing.

In order to braze the cutters in place the cutters are located in their respective sockets with a supply of brazing alloy. The bit body, with the cutters in place, is then heated in a furnace to a temperature at which the brazing alloy melts and spreads by capillary action between the inner surfaces of the sockets and the outer surfaces of the cutters, an appropriate flux being used to facilitate this action.

In use, such drill bits are subject to considerable wear and erosion, for example due to the high pressure flow of drilling fluid over the surface of the bit body for the purpose of cooling and cleaning the cutters and transporting the cuttings to the surface. Matrix-bodied bits are very resistant to such wear and erosion but it is desirable for a steel bodied bit to be hardened and/or formed with a harder erosion-resistant coating.

During the process of brazing the cutters to the bit body, the bit body must be heated to a temperature which is usually in the range of 500°–750° and with the steels hitherto used in the manufacture of the bit bodies of rotary drag-type bits, the heating/cooling cycle employed during brazing of the cutters in position has the effect of reducing the hardness and strength of the steel. In view of this, it is common practice to manufacture the steel body of the bit, or the steel mandrel of a matrix bit, in two parts. In the case of a steel bodied bit, one part of the bit provides the leading surface to which the cutters are brazed while the other part provides the threaded shank for connection to the drill string. The two parts are welded together after the cutters have been brazed to the leading part so that the shank part is not reduced in hardness or strength as a result of the brazing process.

Similarly, in a matrix bodied bit the steel mandrel is formed in two parts. A first part is mounted within the mold so that the solid infiltrated matrix may be bonded to it and the second part of the mandrel, providing the threaded shank, is welded to the first part after the matrix has been formed and after the cutters have been brazed into the sockets in the matrix. The part of the mandrel providing the shank does not therefore have its hardness or strength reduced by the brazing process nor by the heating/cooling cycle of the infiltration process.

It would be desirable to avoid the necessity of forming the bit body or mandrel in two parts. Forming the bit or mandrel in two parts not only adds to the cost of the manufacturing process but the necessity of welding the parts together may compromise the design of the bit body. For example, the bit body must be of sufficient length, and so shaped, as to provide a region where the two parts can be welded together. Accordingly, a one-piece bit body could be shorter in length than a two-piece body and this may have advantage, particularly where the drill bit is for use in steerable drilling systems. Furthermore, the reduction in hardness and strength of the first part of the bit body or mandrel during brazing, or infiltration and brazing, is in itself undesirable and in the case of a steel bodied bit makes it even more necessary to hard face the surface of the bit body to avoid unacceptable wear or erosion. Also, the reduction in strength can lead to premature failure of the bit, particularly due to fracture of the blades on which the cutters are mounted.

The present invention is based on the realisation that by using a different type of steel, or other metal alloy, from those hitherto used for rotary drag-type drill bit bodies, the heating/cooling cycles to which the bit body is subjected during manufacture may be used actually to harden and strengthen the alloy of the bit body rather than reduce its hardness and strength, with the result that the bit body, or mandrel in the case of a matrix-bodied bit, may be formed in one piece, thus avoiding the above-mentioned disadvantages.

This is achieved by using for the bit body or mandrel a precipitation hardening alloy, which may, for example, be steel or stainless steel. As is well known, a precipitation hardening alloy is an alloy in which very fine particles of constituents of the alloy may be caused to precipitate, i.e. initiate and grow from the parent alloy, so as to harden and strengthen the alloy. Such precipitation may be effected by subjecting the alloy to a controlled heating and cooling cycle.

The initiation and growth of precipitates ("precipitation") is a diffusion process, i.e. it is controlled by time and temperature. A certain threshold amount of energy is required to trigger initiation. In certain alloys, there is sufficient energy at room temperature to trigger initiation; albeit at a very slow pace. In the majority of alloys, however, an elevated temperature, and a minimum time at that temperature, is required to trigger initiation.

The size of the precipitates is critical to the degree of hardness, strength, and ductility obtained. The precipitation hardening effect arises from the precipitates causing local distortion of the crystal lattice. The greatest hardness (and the lowest ductility) is achieved when the precipitates are numerous and exceptionally fine. As the temperature is increased above a threshold temperature, larger and fewer particles are precipitated and, as a result, hardness decreases and ductility increases. As the temperature is raised further, there comes a point where the particles are too few and too large to contribute appreciably to the hardness/strength of the alloy.

A "solution" heat treatment in which the alloy is raised to an even higher temperature, acts to "dissolve" the majority of existing precipitates, by taking them back into the solid solution. Subsequent cooling to room temperature tends to lock the precipitation hardening elements into solid solution. The faster the cooling rate, the greater is this tendency. The slower the cooling rate, the more chance there is to initiate and grow precipitates during the cooling cycle. The precipitates created during the cooling cycle, from the higher temperature, tend to be less beneficial to increasing hardness/strength than those created by a subsequent, separate, precipitation hardening heat treatment.

The overall aim, according to the invention, therefore, is to subject the alloy from which a bit body is formed to a combination of time and temperature which causes precipitation hardening and gives rise to the optimum hardness/ductility combination. In theory, this may be achieved by first taking all the precipitates into solution at a high "solution treatment" temperature; followed by fast cooling to room temperature; followed by heating quickly to a lower precipitation hardening temperature and holding at that temperature for a prescribed time; followed by a fast cool back to room temperature. Precipitation hardening may also be effected by performing the latter precipitation hardening step alone.

The present invention lies in controlling the heating/cooling cycle to which the bit body or mandrel is subjected during the process of brazing the cutters to the bit body, so as to effect precipitation hardening, or, in a matrix-bodied bit, controlling the heating/cooling cycle to which the bit body is subjected during the infiltration process, so as to effect a preliminary "solution" heat treatment, as described above, prior to the precipitation hardening effected by subsequently brazing the cutters to the bit body.

SUMMARY OF THE INVENTION

According to the broadest aspect of the present invention, therefore, there is provided a method of manufacturing a rotary drill bit of the kind comprising a bit body having a threaded shank for connection to a drill string and a leading face to which cutters are brazed, the method including the step of forming at least a portion of the bit body from a precipitation hardening alloy, brazing at least some of said cutters to the bit body by a heating and cooling cycle during which the bit body is first heated to a temperature sufficient to melt the brazing material and is then cooled to room temperature, the heating and cooling brazing cycle being controlled in a manner so as also to effect precipitation hardening of the alloy from which the bit body is formed.

In the case of the manufacture of a matrix-bodied bit, the method also includes the initial step of locating in a mold a metal mandrel at least a portion of which is formed from a precipitation hardening alloy, packing the mold around part of the mandrel with particulate matrix-forming material, infiltrating said material at elevated temperature with a molten binding alloy, and cooling the material, binding alloy and mandrel to room temperature to form a solid infiltrated matrix bonded to the mandrel, the heating of the mandrel to the infiltration temperature, and subsequent cooling, being controlled in a manner to effect solution treatment of the alloy in the mandrel.

As previously described, solution treatment may be the first stage in a two-stage precipitation hardening process. Raising the temperature of the precipitation hardening alloy to the typical infiltration temperature, say 1160° C., dissolves the majority of any existing precipitates in the alloy, taking them into solid solution, so that cooling from that temperature, and the subsequent brazing process, forms precipitates which increase the hardness and strength of the alloy, as previously described.

In the case of a matrix-bodied bit preferably substantially all of the mandrel is formed from the precipitation hardening alloy, and the mandrel is preferably formed in one piece.

Similarly in the case of a steel or other metal-bodied bit all of the bit body is preferably formed from the precipitation hardening alloy and, again, is preferably formed in one piece.

The precipitation hardening alloy may be a precipitation hardening steel. For example it may be a martensitic or semi-austenitic type steel. The steel may be a stainless steel.

However, the invention is not limited to the use of steel or stainless steel for the bit body or mandrel and the use of other precipitation hardening alloys is contemplated, for example nickel based alloys.

In any of the methods according to the invention the bit body may be further shaped, for example by machining, following said precipitation hardening.

The invention includes within its scope a rotary drill bit comprising a bit body having a threaded shank for connection to a drill string and a leading face to which cutters are brazed, wherein at least a major portion of the bit body is formed from an alloy which has been precipitation hardened.

The bit body may comprise a metal mandrel around part of the outer surface of which is formed a layer of solid infiltrated matrix material, at least part of the mandrel being formed from said alloy which has been precipitation hardened.

Preferably, substantially all of the mandrel is formed from said alloy which has been precipitation hardened, and the mandrel may be formed in one piece.

Alternatively, all of the bit body may be formed, for example in one piece, from said alloy which has been precipitation hardened.

There may also be advantage in using a precipitation hardening alloy as the infiltration alloy in a matrix-bodied drill bit regardless of whether or not the mandrel is formed from a precipitation hardening alloy also. The use of a precipitation hardening infiltration alloy may be advantageous in increasing the hardness and strength of the resultant solid infiltrated matrix, making such matrix material more resistant to wear and erosion.

Accordingly, the invention also provides a method of manufacturing a rotary drill bit of the kind comprising a bit body having a threaded shank for connection to a drill string and a leading face to which cutters are brazed, the method including the step of forming the bit body by locating in a mold a metal mandrel, packing the mold around part of the mandrel with particulate matrix-forming material, infiltrating the particulate material at elevated temperature with a binding alloy, and cooling the material and mandrel to room temperature to form a solid infiltrated matrix bonded to the mandrel, wherein the infiltration alloy is a precipitation hardening alloy and wherein the heating of the matrix-forming material to the infiltration temperature, and subsequent cooling, are controlled in a manner to effect precipitation hardening of the infiltration alloy.

DETAILED DESCRIPTION OF THE PREFERRED EMBODIMENTS

Figure 1:
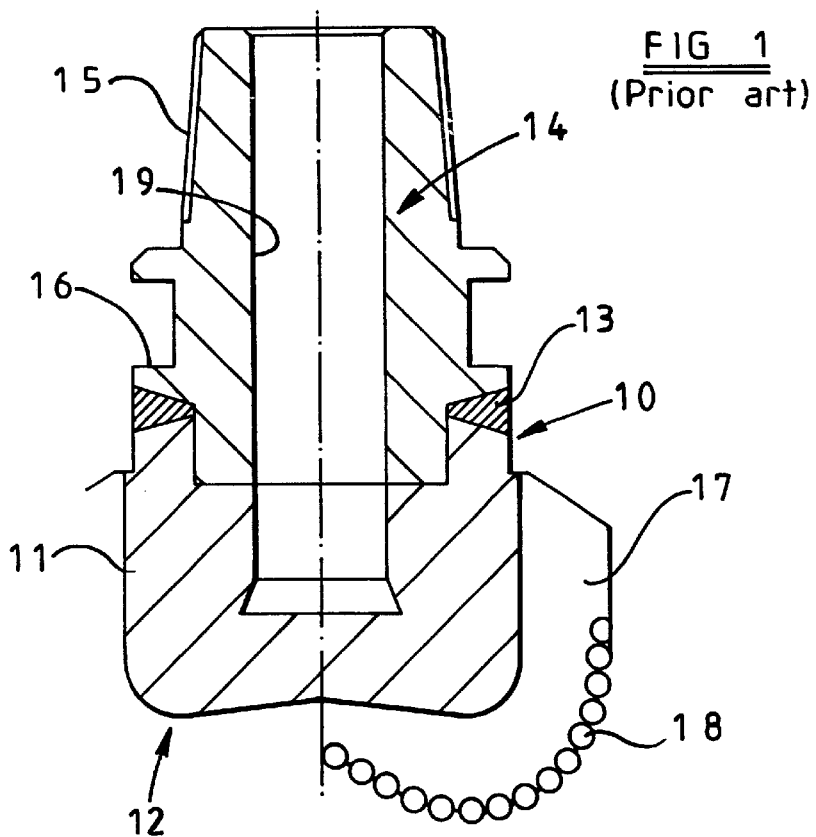
FIG. 1 is a diagrammatic section through a prior art rotary drag-type drill bit.

FIG. 1 shows a prior art steel bodied drill bit. The main body 10 of the drill bit comprises a leading part 11 which provides the leading face 12 of the drill bit. The leading part 11 is welded, as indicated at 13, to a shank part 14 which provides a tapered threaded pin 15 for connecting the drill bit to a drill string, and at least two parallel breaker slots 16 on opposite sides of the shank which, in use, are engaged by a suitable tool when making or breaking the connection between the bit and the drill string.

The leading part 11 of the bit body is formed with a number of blades 17 which extend outwardly away from the axis of rotation of the bit. Cutters 18 are mounted side-by-side along each blade.

As is well known, each cutter may comprise a front facing table of polycrystalline diamond or other superhard material which is bonded in a high pressure high temperature press to a substrate of less hard material, usually cemented tungsten carbide. Each cutter is generally cylindrical and the substrate may be of sufficient axial length that it may be brazed directly into a socket machined in the blade 17. Alternatively, the cutter may be bonded to a generally cylindrical stud or post which is in turn brazed into a socket in the blade. The invention is not limited to the use of cutters of this type, and other forms of cutter may be employed.

The two parts of the bit body 10 are formed with a central passage 19 through which drilling fluid is delivered under pressure, in known manner, to nozzles (not shown) in the leading face 12 of the bit. The flow of drilling fluid from the nozzles is arranged to cool and clean the cutters 18 and to transport the cuttings of the formation being drilled upwardly through the annulus between the drill string and the walls of the borehole.

As previously discussed, in order to braze the cutters 18 into their respective sockets on the blades 17 the part on which the cutters are mounted must be subjected to a heating/cooling cycle in a furnace. This process tends to reduce the hardness and strength of the steel part which is subjected to it, and it is for this reason that the bit body 10 is formed in two parts. It is then only the leading part 11 on which the cutters 18 are to be mounted which subjected to the heating/cooling brazing cycle, this part being subsequently welded to the shank part 14. This ensures that the shank part 14 is not subjected to the reduction in hardness or strength would occur if it were subjected to the brazing cycle.

The two parts of the bit body may be entirely machined to the required shape before being welded together, but it is also possible to effect some machining after the two parts have been welded together. For example, arrangements are known in which the breaker slots 16 extend partly across the weld 13 and in this case the breaker slots are machined after the two parts have been welded together.

This known type of drill bit suffers from certain disadvantages. Thus, the reduction in hardness of the leading part 11 of the bit body during the brazing cycle makes it necessary subsequently to treat the bit part in order to prevent damaging erosion and wear in use. This may be achieved by hardening the part 11 by a process which will not damage the cutters 18 or their brazed connection to the blade 17, or by applying a hard facing to the outer surface of the leading part of the bit body. However, such additional processes add to the complexity of the overall process of manufacturing the bit and inevitably increase the cost.

Also, the necessity of welding the two parts of the bit body together means that each part must be so designed that it can be securely fitted and welded to the other. In practice, this tends to have the effect of increasing the axial length of the drill bit. There is often now a requirement for drill bits to be as axially short as possible, particularly where the bit is to be used in a steerable drilling system, so as more easily to permit deflection of the direction in which the bit drills in the borehole.

Figure 2:
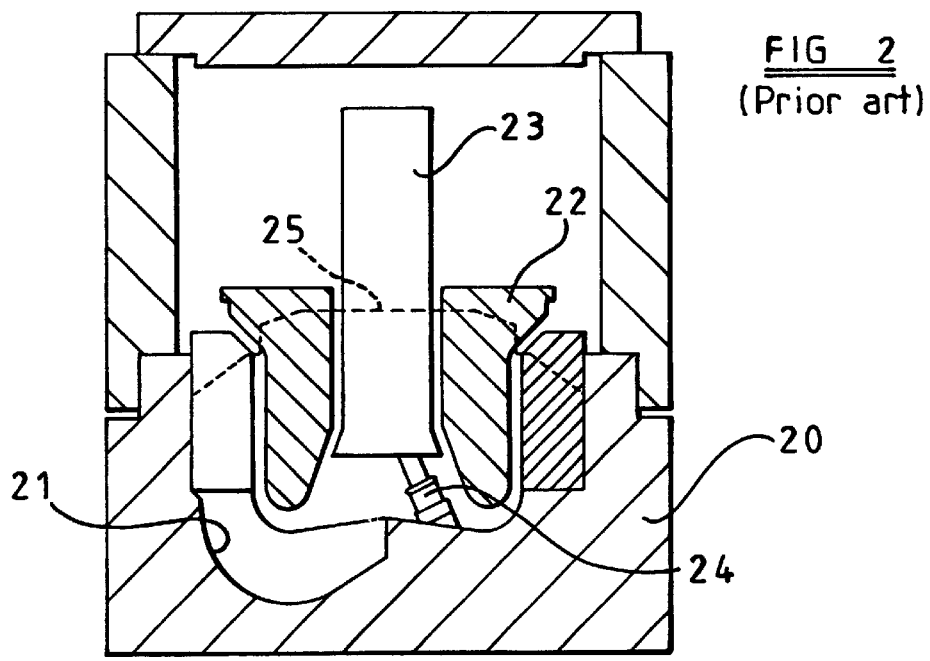
FIG. 2 shows diagrammatically the manufacture of part of a prior art matrix-bodied drill bit.

As previously mentioned, in another form of drag-type drill bit the leading part 11 of the bit body, instead of being wholly machined from steel or other metal, consists of a metal mandrel around which is formed a solid infiltrated matrix. FIG. 2 illustrates a known method of manufacturing a bit body of this type.

Referring to FIG. 2, there is machined a graphite mold 20, the inner surface 21 of which corresponds substantially in shape to the desired outer configuration of the leading part of a two-part bit body, including the blades.

A metal mandrel 22, usually of steel, is supported within the mold 20. Formers 23, 24 are also located within the mold so as to form the central passage in the bit body and the subsidiary passages leading to the nozzles. Graphite formers (not shown) are also located on the interior surface of the mold to form the sockets into which the cutters will eventually be brazed.

The spaces between the mandrel 22 and the interior of the mold 20 are packed with a particulate matrix-forming material, such as particles of tungsten carbide, this material also being packed around the graphite formers. A body of a suitable binder alloy, usually a copper based alloy, is then located around and above the mandrel 22 and packed matrix-forming material. The body of alloy is usually in the form of an annulus which surrounds the central former 23 above the mandrel 22. The mold is then closed and placed in a furnace and heated to a temperature at which the alloy fuses and infiltrates downwardly into the mass of particulate material. The mold is then cooled so that the binder alloy solidifies, binding the tungsten carbide particles together and to the mandrel 22 so as to form a solid infiltrated matrix surrounding the mandrel 22 and in the desired shape of the outer surface of the bit body.

When the matrix-covered mandrel is removed from the mold, the formers are removed so as to define the passages in the bit body and the sockets for the cutters, and the component is then machined to the appropriate final shape, as indicated by the lines 25 in FIG. 2.

The blades of the bit may be entirely formed of matrix or metal cores may be located in the mold at each blade location so as to be surrounded by matrix and thus form a blade comprising a matrix layer on a central metal core.

After machining, the matrix/steel bit part is welded to the machined steel shank part in similar fashion to the arrangement of FIG. 1.

In this method of manufacture of a drill bit, the infiltration temperature to which the components must be heated is significantly higher than the subsequent brazing temperature at which the cutters are brazed within the sockets in the matrix, and the infiltration heating/cooling cycle also has the effect of reducing the hardness and strength of the steel mandrel 22. It is for this reason that, again, the shank part of the drill bit is separately formed from steel and is subsequently welded to the matrix/steel leading part.

By contrast, the present invention allows the whole bit body in a steel or other metal machined bit, or the mandrel in a matrix-bodied bit, to be formed in one piece with the advantages that this gives.

Figure 3:
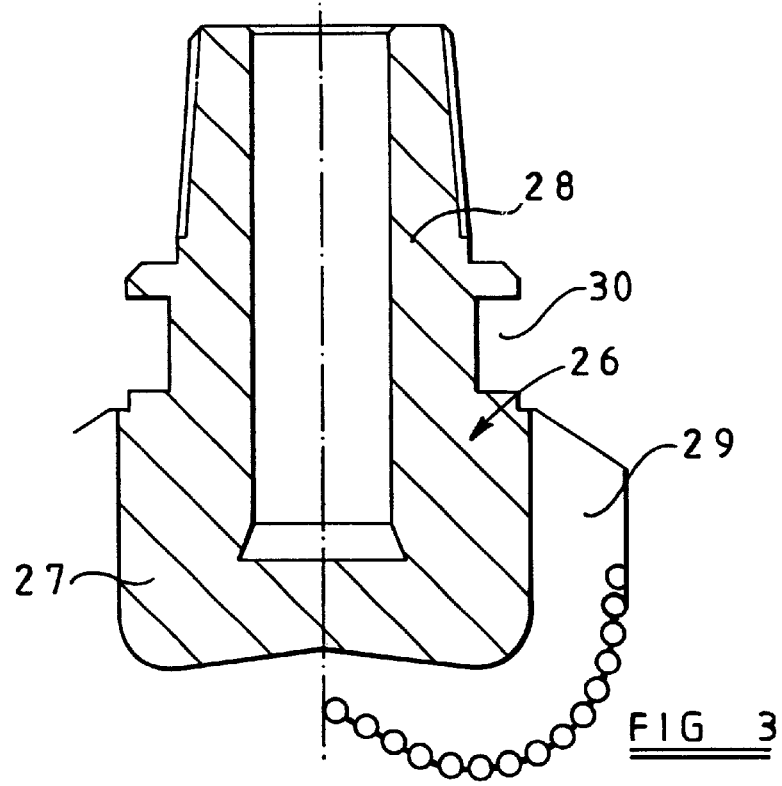
FIG. 3 is a similar view to FIG. 1 showing diagrammatically a drill bit manufactured by the method according to the present invention.

FIG. 3 shows diagrammatically a steel-bodied bit manufactured in accordance with the present invention.

As may be seen from FIG. 3, the steel body 26 of the bit, including the leading part 27, the shank part 28 and blades 29, is machined in one piece from a single solid body of steel or other metal. According to the present invention, however, the steel or other alloy from which the bit body 26 is formed is a precipitation hardening alloy. As previously described, when a precipitation hardening alloy is subjected to an appropriately controlled heating/cooling cycle, particles of constituents of the alloy precipitate and locally distort the lattice of the alloy at the microscopic level to create local stress zones and thereby increase the hardness and strength of the material. It has been found that the heating and cooling cycle to which a bit body must be subjected in order to braze the cutters to the blades 29 can be so controlled that, where the metal of the bit body is a precipitation hardening alloy, the brazing process itself may have the effect of precipitation hardening of the bit body, instead of reducing its hardness and strength as has been the case with the metals used hitherto.

For example, one suitable form of alloy for use in manufacture of the bit body is a 17-4 PH grade of martensitic precipitation hardening stainless steel having the following chemical composition:

|  | Weight % | |
|---|---|---|
|  | Minimum | Maximum |
| Carbon |  | 0.07 |
| Silicon |  | 1.00 |
| Manganese |  | 1.00 |
| Phosphorus |  | 0.04 |
| Sulphur |  | 0.03 |
| Chromium | 15.00 | 17.50 |
| Molybdenum |  | 0.50 |
| Nickel | 3.00 | 5.00 |

-continued

|  | Weight % | |
|---|---|---|
|  | Minimum | Maximum |
| Niobium | 5 × C min | 0.45 |
| Copper | 3.00 | 5.00 |

The metal may be that which conforms to the following standard specifications:

AMS 5622 (remelt)

AMS 5643 QQ-S-763 B

MIL-S-862 B

MIL-C-24111 (Nuclear)

ASTM A564-72 Type 630

W.1.4548

NACE MR.01.75

During the brazing process the temperature of the bit body is raised to the region of 500°–750° C., preferably about 715°–720° C., and is held at this temperature for about 20 minutes before cooling naturally to room temperature. It is found that this cycle is effective for brazing the cutters into their sockets while at the same time effecting precipitation hardening of the whole bit body.

As may be seen from FIG. 3, the fact that the bit body can now be formed in one piece allows the bit to be designed without needing to accommodate welding between two parts. The breaker slots 30 may therefore be closer to the upper ends of the blades 29, thus reducing the overall axial length of the drill bit.

Figure 4:
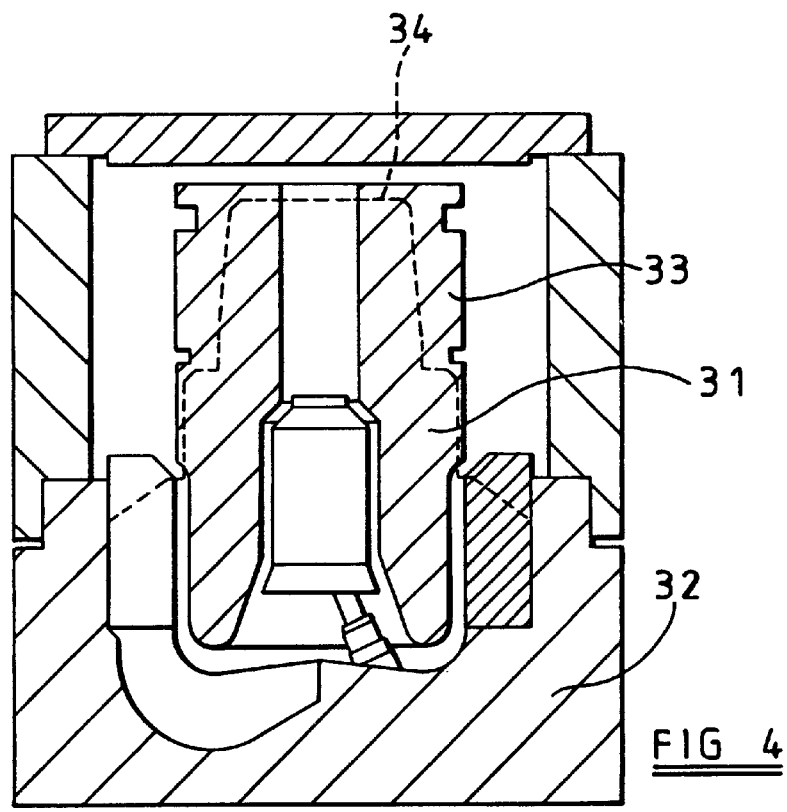
FIG. 4 shows diagrammatically the manufacture of a matrix-bodied drill bit by a method according to the present invention.

FIG. 4 shows the use of a precipitation hardening alloy in the manufacture of a matrix bodied bit.

As in the arrangement of FIG. 2, a metal mandrel 31 is located within a suitably shaped graphite mold 32 and matrix-forming particulate material is packed around the lower part of the mandrel before being infiltrated in a furnace with an appropriate binder alloy.

According to the present invention, however, the mandrel 31 is formed from a precipitation hardening alloy, such as the 17-4 PH grade stainless steel referred to above. In this case, the mandrel 31 includes an upper portion 33 from which the threaded shank 34 of the bit body may be subsequently machined as indicated in chain lines in FIG. 4.

During the infiltration process the mandrel is heated to a temperature of about 1160° C. before being allowed to cool naturally to room temperature. During the heating part of this "solution" treatment, the majority of any existing precipitates in the alloy are dissolved into solid solution. During the subsequent cooling from the infiltration temperature, precipitates of constituents of the alloy are formed in solution as the first stage of a precipitation hardening process. The bit body is then subjected to a further heating/cooling cycle in order to effect brazing of the cutters to the sockets in the matrix part of the bit and during this heating/cooling cycle the precipitation hardening is completed.

Other suitable forms of precipitation hardening alloys are 15-5 PH grade and 520 B grade stainless steels having the following typical compositions.

15-5 PH Grade:

|  | Weight % | |
| --- | --- | --- |
|  | Minimum | Maximum |
| Carbon |  | 0.07 |
| Silicon |  | 1.00 |
| Manganese |  | 1.00 |
| Phosphorus |  | 0.03 |
| Sulphur |  | 0.015 |
| Chromium | 14.00 | 15.50 |
| Molybdenum |  | 0.50 |
| Nickel | 3.50 | 5.50 |
| Niobium | 5 × C min | 0.45 |
| Copper | 2.50 | 4.50 |

The metal may be that which conforms to the following standard specifications:

AMS 5659 (remelt)
ASTM A630 Type XM12

520 B Grade:

|  | Weight % |
| --- | --- |
| Carbon | 0.05 |
| Chromium | 14.00 |
| Molybdenum | 1.70 |
| Nickel | 5.60 |
| Niobium | 0.30 |
| Copper | 1.80 |

The metal may be that which conforms to the following standard specifications:

BS.5143
BS.5144

Other proprietary grades of stainless steel may be used allowing up to 3% Molybdenum, 0.15% carbon 8% nickel and down to 13% chromium.

Semi-austenitic precipitation hardening stainless steels may also be employed, including 17-7 PH grade stainless steel having the following composition:

|  | Weight % |
| --- | --- |
| Carbon | 0.07 |
| Chromium | 17.0 |
| Nickel | 7.0 |
| Aluminium | 0.4 |
| Titanium | 0.4 to 1.2 |

Other proprietary grades of semi-austenitic precipitation hardening stainless steels may be used, in grades allowing up to 0.2% carbon, 2% copper, 3% molybdenum, 2% cobalt, 1.2% aluminium, 2% cobalt, 0.3% phosphorus and down to 12% chromium and 3.5% nickel. All percentages are by weight.

Although the specific alloys described above are steel, and this is preferred, the present invention does not exclude the use of other precipitation hardening alloys in the manufacture of the bit body, or the mandrel in a matrix-bodied bit, provided of course that the alloy has other characteristics which are suitable for use as the body of a drag-type drill bit. Such required characteristics are well known to those skilled in the art and will not be discussed in detail.

As previously mentioned, in the manufacture of a matrix-bodied bit, as described above, there may also be advantage in using a precipitation hardening alloy as the infiltration alloy, whether or not the mandrel is formed from a precipitation hardening alloy also. The use of a precipitation hardening infiltration alloy may increase the hardness and strength of the resultant solid infiltrated matrix, since the alloy will be precipitation hardened during the infiltration and subsequent brazing heating/cooling cycles.

Typical precipitation hardening copper-base alloys which may be used as infiltrant alloys in the formation of matrix-bodied bits are defined in the following Tables 1 and 2.

Table 3 shows, for 17-4 PH steel, the theoretical time and temperature conditions of solution treatment and precipitation hardening which will achieve the optimum hardness and strength for the alloy. It also shows the actual conditions which have been employed to achieve precipitation hardening in the two heating/cooling stages involved in the manufacture of a matrix bodied bit, together with the actual hardness and strength achieved.

It will be seen that the hardness and strength achieved in the process according to the invention is comparable to the hardness and strength of the pin steel used in prior art two-part bits, i.e. that portion of the two-part bit which is not subjected to heat treatment and provides the threaded pin of the bit, for attachment to the drill string.

Whereas the present invention has been described in particular relation to the drawings attached hereto, it should be understood that other and further modifications, apart from those shown or suggested herein, may be made within the scope and spirit of the present invention.

TABLE 1

ALLOYS WITH ADDITIONS OF ALUMINIUM, TITANIUM, NIOBIUM (COLUMBIUM IN USA), TO PROMOTE PRECIPITATION HARDENING

| ALLOY GROUP | Trade Name | Manufacturer | COMPOSITIONAL LIMITS (Wt %) | | | | | | |
| --- | --- | --- | --- | --- | --- | --- | --- | --- | --- |
|  |  |  | Copper | Nickel | Manganese | Aluminium | Iron | Silicon | Others |
| #1 Cupro-Nickels | Hiduron ® 130 | Langley Alloys | Remainder | 15 | up to 2 | 3 | up to 2 | Residual | Residual |
|  | Hiduron ® 191 | Langley Alloys | Remainder | 15 | 5 | 2 | 1 | Residual | Up to 1% Cr for grain refinement. Others |

TABLE 1-continued

ALLOYS WITH ADDITIONS OF ALUMINIUM, TITANIUM, NIOBIUM (COLUMBIUM IN USA), TO PROMOTE PRECIPITATION HARDENING

| ALLOY GROUP | Trade Name | Manufacturer | COMPOSITIONAL LIMITS (Wt %) | | | | | | |
|---|---|---|---|---|---|---|---|---|---|
| | | | Copper | Nickel | Manganese | Aluminium | Iron | Silicon | Others |
| | Hiduron ® 501 | Langley Alloys | Remainder | 14 | 10 | 2 | 5 | Residual | residual Up to 1% Cr for grain refinement. Others residual |
| | Marinel ® | Langley Alloys | Remainder | 17 | 5 | 2 | 1 | Residual | Up to 1% Cr for grain refinement. Others residual + "Small" additions of Ti, and Nb. Exact values not known. Best guess 0.5% of each. |
| | "Blanket" Spec. for Hiduron ® alloys | Langley Alloys | Remainder | 12–20 | up to 12 | 1–5 | up to 5 | Residual | Up to 2% of each of Cr, Ti and Nb |
| | G-Bronze ® | Johnson Matthey | Remainder | 2.5 | Residual | Residual | Residual | 0.6% | Residual |

TABLE 2

ALLOYS WITH ADDITIONS OF BERYLLIUM, TITANIUM, AND ZIRCONIUM TO PROMOTE PRECIPITATION HARDENING

| ALLOY GROUP | Common Title | Manufacturer | COMPOSITIONAL LIMITS (Wt %) | | | | | | |
|---|---|---|---|---|---|---|---|---|---|
| | | | Copper | Nickel | Beryllium | Iron | Cobalt | Silicon | Others |
| #1 Beryllium Copper Special Alloys | 21C | Various. Not Proprietary | Remainder | — | 2.00–2.25 | Residual | 1.0–1.2 | 0.2–0.4 | Residual |
| | 71C (CA966) | Various. Not Proprietary | Remainder | 29.0–33.0 | 0.4–0.7 | 0.8–1.1 | Residual | Residual | Residual |
| | 72C | Various. Not Proprietary | Remainder | 29.0–33.0 | (1.1–1.2) | 0.7–1.0 | (2) | (5) | 0.1–0.2 Zirconium; 0.1–0.2 Titanium |

TABLE 3

17-4 PH stainless steel, the ideal and actual conditions and results.

| Ideal or Actual | "Solution" Treatment | | "Precipitation Hardening" Treatment | | Mechanical Properties | | |
|---|---|---|---|---|---|---|---|
| | Temp. and Time | Cooling Medium and Rate | Temp. and Time | Cooling Medium and Rate | Hardness (HRC) | Strength Proof/Tensile (MPa) | Ductility Charpy (Joules) |
| 17-4 PH. Ideal | 1040° C. × 0.5 hr | Oil/Air (Slow to Medium) | 620° C. × 4 hrs | Air (Slow) | 33 | 850/1000 | 60 |
| 17-4 PH. Actual Infil. and Braze Cycle combined | 1160° C. × (2 to 5) hrs | Water Quench on mould base (Slow) | 0.5 to 1.0 hours to 650° C. Followed by 0.5 to 1 hour at 650° C. Followed by 0.5 to 1 hour to 720° C. Followed by 0.5 to 1 hour at 720° C. Followed by furnace cool (0.5 to 1.5 hours) to 670° C. Followed by air cool | | 30 | 690/1040 | 50 |
| 17-4 | — | — | 0.5 to 1.0 hours to | | Not yet tested but likely to be | | |

TABLE 3-continued 17-4 PH stainless steel, the ideal and actual conditions and results.

| Ideal or Actual | "Solution" Treatment | | "Precipitation Hardening" Treatment | | Mechanical Properties | | |
|---|---|---|---|---|---|---|---|
| | Temp. and Time | Cooling Medium and Rate | Temp. and Time | Cooling Medium and Rate | Hardness (HRC) | Strength Proof/ Tensile (MPa) | Ductility Charpy (Joules) |
| Actual Braze Cycle alone | | | 650° C. Followed by 0.5 to 1 hour at 650° C. Followed by 0.5 to 1 hour to 720° C. Followed by 0.5 to 1 hour at 720° C. Followed by furnace cool (0.5 to 1.5 hours) to 670° C. Followed by air cool | | similar to current pin steel (below) | | |
| Current Pin Steel | — | — | — | | 35 | 760/ 1000 | 55 |

What is claimed:

1. A method of manufacturing a rotary drill bit comprising a bit body having a threaded shank for connection to a drill string and a leading face to which cutters are brazed, the method including the step of forming at least a portion of the bit body from a precipitation hardening alloy, brazing at least some of said cutters to the bit body by a heating and cooling cycle during which the bit body is first heated to a temperature sufficient to melt the brazing material and is then cooled to room temperature, the heating and cooling brazing cycle being controlled in a manner so as also to effect precipitation hardening of the alloy from which the bit body is formed.

2. A method according to claim 1, including the initial step of locating in a mold a metal mandrel at least a portion of which is formed from a precipitation hardening alloy, packing the mold around part of the mandrel with particulate matrix-forming material, infiltrating said material at elevated temperature with a molten binding alloy, and cooling the material, binding alloy and mandrel to room temperature to form a solid infiltrated matrix bonded to the mandrel, the heating of the mandrel to the infiltration temperature, and subsequent cooling, being controlled in a manner to effect solution treatment of the alloy in the mandrel.

3. A method according to claim 2, wherein substantially all of the mandrel is formed from the precipitation hardening alloy.

4. A method according to claim 3, wherein the mandrel is formed in one piece.

5. A method according to claim 1, wherein substantially all of the bit body is formed from the precipitation hardening alloy.

6. A method according to claim 5, wherein substantially all of the bit body is formed in one piece.

7. A method according to claim 1, wherein the precipitation hardening alloy is a precipitation hardening steel.

8. A method according to claim 7, wherein the precipitation hardening alloy is a martensitic or semi-austenitic steel.

9. A method according to claim 1, wherein the precipitation hardening alloy is a stainless steel.

10. A method according to claim 1, wherein the precipitation hardening alloy is a nickel based alloy.

11. A method according to claim 1, wherein the bit body is further shaped following said precipitation hardening.

12. A method of manufacturing a rotary drill bit comprising a bit body having a threaded shank for connection to a drill string and a leading face to which cutters are brazed, the method including the step of forming the bit body by locating in a mold a metal mandrel, packing the mold around part of the mandrel with particulate matrix-forming material, infiltrating the particulate material at elevated temperature with a binding alloy, and cooling the material and mandrel to room temperature to form a solid infiltrated matrix bonded to the mandrel, wherein the infiltration alloy is a precipitation hardening alloy and wherein the heating of the matrix-forming material to the infiltration temperature, and subsequent cooling, are controlled in a manner to effect precipitation hardening of the infiltration alloy.

* * * * *